US009789836B2

United States Patent
Byers

(10) Patent No.: US 9,789,836 B2
(45) Date of Patent: Oct. 17, 2017

(54) RING BRACKET FOR SNAP-LOCK ENGAGEMENT VERIFICATION

(71) Applicant: GM Global Technology Operations LLC, Detroit, MI (US)

(72) Inventor: Charles P. Byers, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/842,393

(22) Filed: Sep. 1, 2015

(65) Prior Publication Data

US 2017/0057445 A1    Mar. 2, 2017

(51) Int. Cl.
 B60R 21/205  (2011.01)
 B60R 21/20   (2011.01)
 B60R 21/217  (2011.01)

(52) U.S. Cl.
 CPC ............ B60R 21/205 (2013.01); B60R 21/20 (2013.01); B60R 21/217 (2013.01)

(58) Field of Classification Search
 CPC ... B60R 21/20; B60R 21/205; B60R 21/2171; B60R 21/217; B60R 2021/21506
 See application file for complete search history.

(56) References Cited

U.S. PATENT DOCUMENTS

| | | | | |
|---|---|---|---|---|
| 4,989,897 A | * | 2/1991 | Takada .................. | B60R 21/217 280/728.3 |
| 5,167,427 A | * | 12/1992 | Baba ..................... | B60R 21/217 280/728.3 |
| 5,303,951 A | * | 4/1994 | Goestenkors ......... | B60R 21/215 280/728.3 |
| 5,435,596 A | * | 7/1995 | Rose .................... | B60R 21/2171 280/728.2 |
| 5,445,409 A | * | 8/1995 | Abramczyk ........ | B60R 21/2171 280/728.2 |
| 5,460,400 A | * | 10/1995 | Davidson ............ | B60R 21/2171 280/728.2 |

(Continued)

FOREIGN PATENT DOCUMENTS

| | | |
|---|---|---|
| DE | 8904999 U1 | 7/1989 |
| DE | 19807937 A1 | 8/1998 |

(Continued)

OTHER PUBLICATIONS

German Office Action dated Apr. 27, 2017 ; Application No. 10 2016 115 385.0; Applicant: GM Global Technology Operations LLC; 9 pages.

*Primary Examiner* — Barry Gooden, Jr.
(74) *Attorney, Agent, or Firm* — BrooksGroup

(57) ABSTRACT

A number of variations may include a method to verify engagement between a passenger airbag module and an instrument panel chute comprising: providing a passenger airbag module with a plurality of snap-locks and an instrument panel chute with a plurality of chute tabs; pressing the passenger airbag onto the instrument panel chute so that the plurality of snap-locks engage with the plurality of chute tabs; placing a ring bracket around the plurality of snap-locks and the plurality of chute tabs and attaching the ring bracket to the passenger airbag using a first screw and a second screw to verify whether the plurality of snap-locks are engaged with the chute tabs.

17 Claims, 4 Drawing Sheets

(56) References Cited

U.S. PATENT DOCUMENTS

| | | | | |
|---|---|---|---|---|
| 5,474,323 | A * | 12/1995 | Davidson | B60R 21/2171 280/728.2 |
| 5,527,064 | A * | 6/1996 | Kai | B60R 21/205 280/728.2 |
| 5,639,112 | A * | 6/1997 | Phillion | B60R 21/205 280/728.2 |
| 5,735,542 | A * | 4/1998 | Bohn | B60R 21/2171 280/728.2 |
| 5,803,487 | A * | 9/1998 | Kikuchi | B60R 21/205 280/728.2 |
| 5,876,058 | A * | 3/1999 | Nemoto | B60R 21/2171 280/728.2 |
| 6,092,833 | A * | 7/2000 | Nariyasu | B60R 21/2171 280/728.2 |
| 6,126,191 | A * | 10/2000 | Pepperine | B60R 21/2171 280/728.2 |
| 6,299,196 | B1 * | 10/2001 | Suzuki | B60R 21/2171 280/728.2 |
| 6,543,802 | B1 * | 4/2003 | Uchiyama | B60R 21/216 280/728.2 |
| 6,623,029 | B2 * | 9/2003 | Sun | B60R 21/205 280/728.2 |
| 6,840,536 | B2 * | 1/2005 | Ahn | B60R 21/2171 280/728.2 |
| 7,234,724 | B1 * | 6/2007 | Cowelchuk | B60R 21/205 280/728.2 |
| 7,874,574 | B2 * | 1/2011 | Cortina | B60R 21/21656 280/728.2 |
| 8,016,317 | B1 * | 9/2011 | Bruyneel | B60R 21/2171 280/728.2 |
| 9,434,058 | B2 * | 9/2016 | Kaphengst | B23P 11/00 |
| 2002/0024197 | A1 * | 2/2002 | Thomas | B60R 21/2171 280/728.2 |
| 2002/0050701 | A1 * | 5/2002 | Amamori | B60R 21/2171 280/728.2 |
| 2002/0067028 | A1 * | 6/2002 | Ostermann | B60R 21/2171 280/728.2 |
| 2003/0047915 | A1 * | 3/2003 | Sun | B60R 21/205 280/728.2 |
| 2003/0205890 | A1 * | 11/2003 | Davis, Jr. | B60R 21/20 280/732 |
| 2004/0145164 | A1 * | 7/2004 | North | B60R 21/2165 280/732 |
| 2005/0087963 | A1 * | 4/2005 | Dailey | B60R 21/205 280/728.3 |
| 2005/0218630 | A1 * | 10/2005 | Tata | B60R 21/2171 280/728.2 |
| 2005/0225062 | A1 * | 10/2005 | Dumbrique | B60R 21/2165 280/728.3 |
| 2006/0038385 | A1 * | 2/2006 | Baumbach | B60R 21/2171 280/728.2 |
| 2006/0131844 | A1 * | 6/2006 | Trevino | B60R 21/2165 280/728.3 |
| 2006/0290109 | A1 * | 12/2006 | Kielinen | B60R 21/205 280/728.2 |
| 2007/0007753 | A1 * | 1/2007 | Williams | B60R 21/217 280/728.2 |
| 2007/0096441 | A1 * | 5/2007 | Cortina | B60R 21/21656 280/728.3 |
| 2007/0120346 | A1 * | 5/2007 | Kwon | B60R 21/2165 280/728.2 |
| 2007/0187930 | A1 * | 8/2007 | Chitteti | B60R 21/2165 280/728.2 |
| 2008/0073884 | A1 * | 3/2008 | Kutchey | B60R 21/205 280/728.3 |
| 2009/0033070 | A1 * | 2/2009 | Dumbrique | B60R 21/205 280/728.2 |
| 2009/0194977 | A1 * | 8/2009 | Sahm | B60R 21/2171 280/728.2 |
| 2009/0250914 | A1 * | 10/2009 | Kemp | B60R 21/217 280/741 |
| 2010/0045004 | A1 * | 2/2010 | Glockler | B60R 21/2171 280/728.2 |
| 2010/0127482 | A1 * | 5/2010 | Onohara | B60R 21/045 280/728.2 |
| 2010/0230935 | A1 * | 9/2010 | Rose | B60R 21/201 280/728.2 |
| 2011/0148077 | A1 * | 6/2011 | Enders | B60R 21/205 280/728.2 |
| 2011/0227318 | A1 * | 9/2011 | Schorle | B60R 21/217 280/728.2 |
| 2012/0007346 | A1 * | 1/2012 | Morawietz | B60R 21/205 280/728.2 |
| 2012/0200107 | A1 * | 8/2012 | Kobayashi | B60R 7/06 296/37.12 |
| 2013/0113191 | A1 * | 5/2013 | Schneider | B60R 21/215 280/728.3 |
| 2014/0077481 | A1 * | 3/2014 | Matsumoto | B60R 21/2165 280/728.3 |
| 2014/0167396 | A1 * | 6/2014 | Webber | B60R 21/2155 280/743.1 |
| 2014/0265261 | A1 * | 9/2014 | Surdu | B60R 21/20 280/728.2 |
| 2015/0033531 | A1 * | 2/2015 | Kaphengst | B23P 11/00 29/407.1 |
| 2015/0175118 | A1 * | 6/2015 | Hattensperger | B60R 21/217 280/728.2 |
| 2015/0266443 | A1 * | 9/2015 | Kojima | B60R 21/217 280/728.2 |
| 2016/0176376 | A1 * | 6/2016 | Mazzocchi | B60R 21/215 280/728.2 |
| 2016/0355153 | A1 * | 12/2016 | Barnes | B60R 21/215 |

FOREIGN PATENT DOCUMENTS

| | | |
|---|---|---|
| DE | 19943368 A1 | 3/2001 |
| DE | 69727740 T2 | 11/2004 |

* cited by examiner

RING BRACKET FOR SNAP-LOCK ENGAGEMENT VERIFICATION

TECHNICAL FIELD

The field to which the disclosure generally relates to includes airbags.

BACKGROUND

A passenger airbag module may be snap-fit into an instrument panel chute.

SUMMARY OF ILLUSTRATIVE VARIATIONS

A number of variations may include a method to verify engagement between a passenger airbag (PAB) module and an instrument panel (IP) chute comprising: providing a PAB module with a plurality of snap-locks and an IP chute with a plurality of chute tabs; pressing the PAB module onto the IP chute so that the plurality of chute tabs engage with the plurality of snap-locks; and placing a ring bracket around the plurality of tabs and the plurality of snap-locks and attaching the ring bracket to the PAB module using a first screw and a second screw to verify whether the plurality of snap-locks are engaged with the chute tabs.

A number of variations may include a method to verify PAB module to IP chute snap-lock engagement comprising: snap-fitting a PAB module with an IP chute; placing a ring bracket around a perimeter of the PAB module; screwing a first screw and a second screw through the ring bracket into the PAB module; detecting at least one of the presence of the first screw and the second screw or a torque of the first screw and the second screw with an automated control system; and locking the PAB module and the IP chute to an assembly station if at least one of the first screw or the second screw is not present or if the torque of the first screw or the second screw is not within a predetermined range.

A number of variations may include a product comprising: a ring bracket comprising a front portion, a rear portion, a first side portion, a second side portion, an inner surface, and an outer surface, wherein the first side portion and the second side portion are constructed and arranged to each accommodate a screw; and wherein the inner surface of the ring bracket is constructed and arranged to contour an outer perimeter of a PAB module and IP chute assembly engagement area.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In a number of variations, a vehicle may include a PAB module 30 which may be installed within an instrument panel (not illustrated) of the vehicle. Any number of impact events may cause the PAB module 30 to deploy through the instrument panel. In a number of variations, an IP chute 10 may be used to assist in deployment of the PAB module 30 through the instrument panel.

Figure 1:
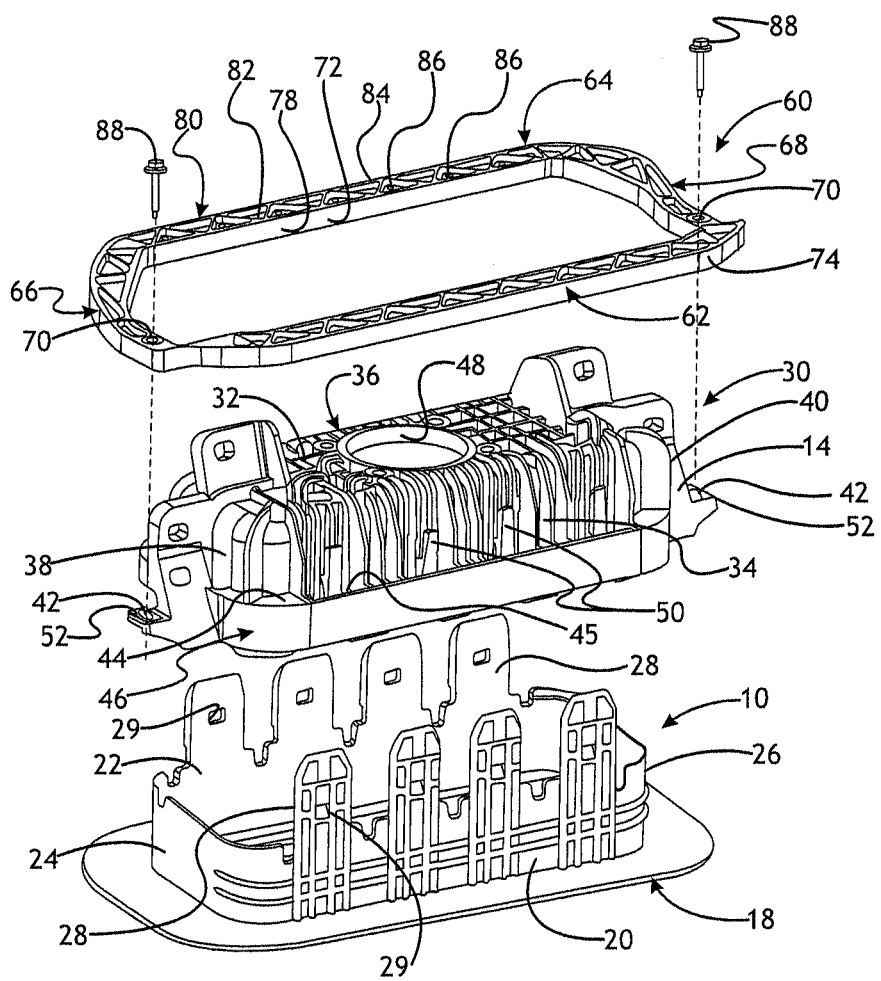
FIG. 1 illustrates an exploded view of a ring bracket, PAB module, and IP chute assembly according to a number of variations.

Referring to FIG. 1, in a number of variations, the PAB module 30 may be constructed and arranged to contour a portion of an IP chute 10. The PAB module 30 may include a housing 14 which may include a bottom surface 32, a front surface 34, a rear surface 36, a first side surface 38, and a second side surface 40. The front surface 34, rear surface 36, first side surface 38, and second side surface 40 may extend upward from the bottom surface 32. A lip 44 may extend outward from the top ends 46 of the front surface 34, rear surface 36, first side surface 38, and the second side surface 40. The lip 44 may also include a plurality of openings 45 which may be constructed and arranged to accommodate chute tabs 28 on the IP chute 10, as will be discussed hereafter. The bottom surface 32 may also include an opening defined by an inner surface 48 which may be constructed and arranged to accommodate a PAB inflator (not illustrated). In a number of variations, the PAB module 30 may also include a plurality of snap-locks 50 which may extend vertically along the front surface 34 and the rear surface 36 of the PAB module 30. The snap-locks 50 may include a protrusion 51 (variations of which are illustrated in FIGS. 3-7 and 9) which may be constructed and arranged to snap-fit within a chute tab 28 on the IP chute 10 as will be discussed hereafter. The first side surface 38 and the second side surface 40 may each also include an opening 42 defined by an inner surface which may be constructed and arranged to accommodate a screw 88. In one variation, a U-clip nut 52 may be attached to each of the side surfaces 38, 40 so that the U-clip nut 52 aligns with the opening 42. In a number of variations, the screws 88 may be used to attach a ring bracket 60 to the PAB module 30, as will be discussed hereafter.

In a number of variations, an IP chute 10 may include a top surface 18, a front surface 20, a rear surface 22, a first side surface 24, and a second side surface 26. The top surface 18 may be constructed and arranged to allow a PAB cushion to deploy through it during a deployment event. In a number of variations, the front surface 20 and the rear surface 22 may include a plurality of chute tabs 28 which may be constructed and arranged to snap-fit with the plurality of snap-locks 50 on the PAB module 30. The chute tabs 28 may extend vertically from the front surface 20 and the rear surface 22 and may each include a cutout 29, a variation of which is illustrated in FIG. 1, which may be constructed and arranged to accommodate the protrusions 51 on the PAB module snap-locks 50 so that the PAB module 30 and the IP chute 10 may snap-fit together.

It is noted that in a number of variations, the snap-lock engagement between the PAB module 30 and the IP chute 10 may be reversed so that the PAB module 30 may include tabs and the IP chute 10 may include snap-locks constructed and arranged as discussed above, to provide the snap-fit engagement between the PAB module 30 and the IP chute 10.

Figure 2:
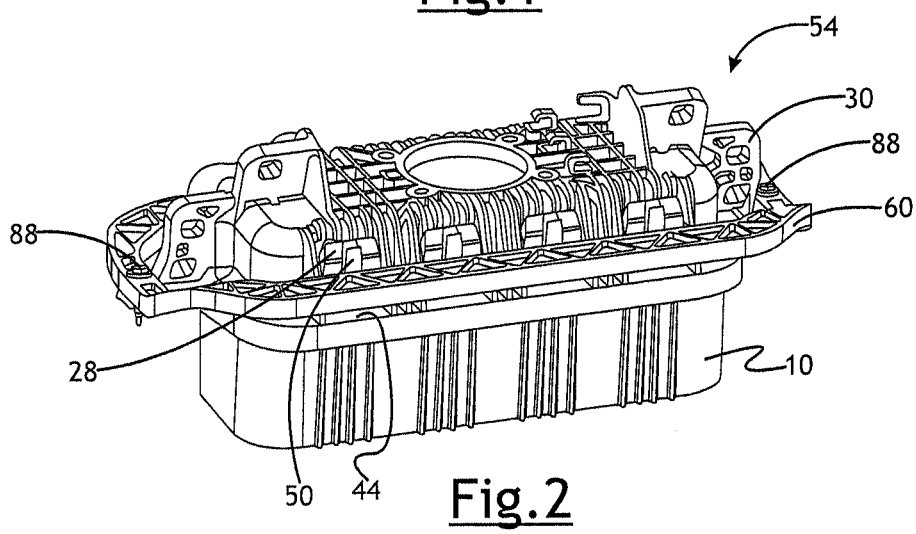
FIG. 2 illustrates a perspective view of a ring bracket verification part assembled onto a PAB module and IP chute assembly where all snap-lock interfaces are fully seated correctly according to a number of variations.

Referring to FIG. 2, in a number of variations, during assembly, the PAB module 30 may be attached to the IP chute 10 by placing the PAB module 30 onto the IP chute 10 so that the chute tabs 28 on the IP chute 10 align with and extend within the openings 45 in the PAB module 30. The PAB module 30 may then be pressed onto the IP chute 10 so that the protrusions 51 on the plurality of snap-locks 50 on the PAB module 30 snap-fit within the cutouts 29 on the IP chute tabs 28. In a number of variations, a ring bracket 60 may then be attached to the PAB module 30 using a first and a second screw 88 and may be used to verify that the PAB module 30 and the IP chute 10 are properly engaged with each other through the snap-fit engagement, as will be discussed hereafter. The use of the ring bracket 60 may enable an assembly plant to easily verify proper engagement between the PAB module 30 and the IP chute 10 with simplified equipment.

Figure 3:
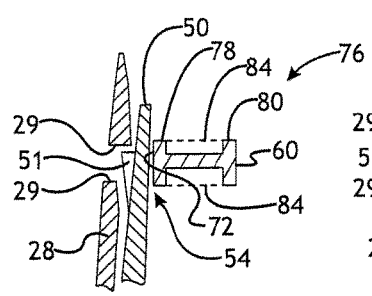
FIG. 3 illustrates a section view of a ring bracket having an I-beam shaped cross-section according to a number of variations.
Figure 4:
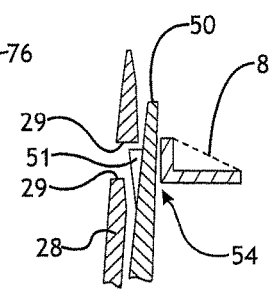
FIG. 4 illustrates a section view of a ring bracket having an L-shaped cross-section according to a number of variations.
Figure 5:
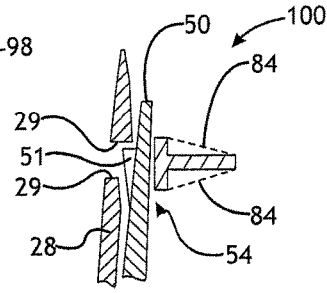
FIG. 5 illustrates a section view of a ring bracket having a T-shaped cross-section according to a number of variations.
Figure 6:
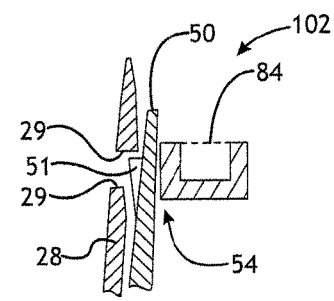
FIG. 6 illustrates a section view of a ring bracket having a U-shaped cross-section according to a number of variations.
Figure 7:
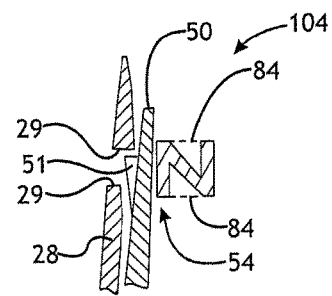
FIG. 7 illustrates a section view of a ring bracket having a Z-shaped cross-section according to a number of variations.

Referring to FIGS. 1-7, in a number of variations, a ring bracket 60 may be constructed and arranged to contour the outer perimeter of the PAB module and IP chute assembly 54 adjacent the snap-locks 50 and the chute tabs 28. The ring bracket 60 may include a front portion 62, a rear portion 64, a first side portion 66, a second side portion 68, an inner surface 72, and an outer surface 74, a variation of which is illustrated in FIG. 1. In one variation, the ring bracket 60 may be circular or rounded. In one variation, the ring bracket 60 may be one single unitary and continuous component. In another variation, the ring bracket 60 may comprise two or more separate pieces. In a number of variations, the front portion 62, the rear portion 64, the first side portion 66, and the second side portion 68 may comprise a geometry which may increase the stiffness of the ring bracket 60. In one variation, the ring bracket 60 may comprise an I-beam shaped cross-section 76 having a first flange 78, a second flange 80, and a web 82 extending therebetween, a variation of which is illustrated in FIGS. 1 and 3. The I-beam shape 76 may provide increased stiffness of the ring bracket 60. In a number of variations, the web 82 may further include w-ribs 84 which may be similar to a bridge truss which may further increase the stiffness of the ring bracket 60. The above configuration may also increase dimensional stability and uniform shrinkage during the forming of the ring bracket 60. Increased stiffness of the ring bracket 60 may also increase the stiffness of the PAB module and IP chute assembly 54 which may enhance the snap-lock performance during deployment. It is noted that the construction of the ring bracket 60 may also mitigate bell mouth issues during a PAB module 30 deployment event. In one variation, the I-beam web 82 height may be increased or decreased depending on the design configuration/requirements of the PAB module 30 to further reduce PAB module bell mouthing. A ring bracket 60 having an I-beam shaped 76 cross-section is discussed above for illustrative purposes only, and it is noted that any number of variations of cross-sections may be used including, but not limited to, an L-shape 98, a variation of which is illustrated in FIG. 4; a T-shape 100, a variation of which is illustrated in FIG. 5; a U-shape 102, a variation of which is illustrated in FIG. 6; or a Z-shape 104, a variation of which is illustrated in FIG. 7, may be used based on design parameters and/or system performance requirements. The above configurations may also include w-ribs 84 as discussed above to increase the stiffness of the ring bracket 60. The stiffness of the ring bracket 60 may also be adjusted by material selection. The ring bracket 60 may also ensure that the PAB module 30 and the IP chute 10 remain snap-fit together during a deployment event.

In a number of variations, the first side portion 66 and the second side portion 68 of the ring bracket 60 may also each include an opening 70 defined by an inner surface which may be constructed and arranged to accommodate a screw 88 which may be used to attach the ring bracket 60 to the PAB module 30, as will be discussed hereafter. In a number of variations, the ring bracket 60 may also include one or more lightening holes 86 which may be used to minimize mass impact while maintaining stiffness, a variation of which is illustrated in FIG. 1. The ring bracket 60 may comprise any number of materials including, but not limited to, a plastic or a metallic. The grade of plastic or metal may be selected based on system performance requirements including, but not limited to, stiffness, cost, and/or mass. The ring bracket 60 may be formed using any number of processes including, but not limited to, injection molding, stamping, or die casting.

Figure 8:
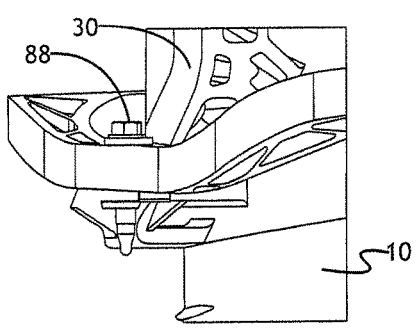
FIG. 8 illustrates a close-up view of a screw interface between a ring bracket and a PAB module and IP chute assembly where all snap-lock interfaces are fully seated correctly according to a number of variations.
Figure 9:
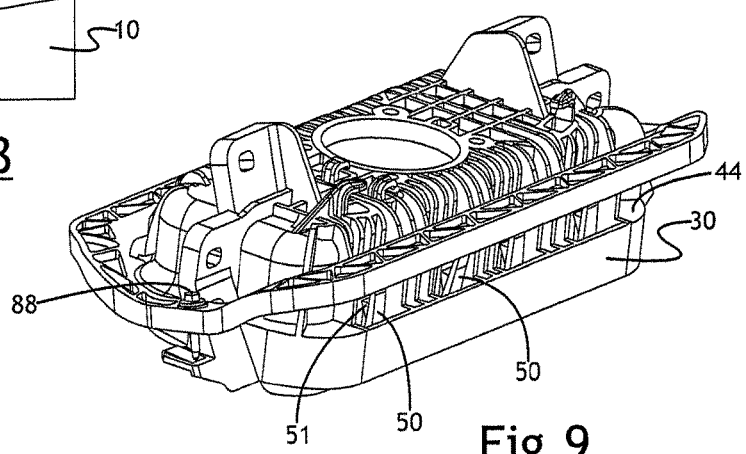
FIG. 9 illustrates a perspective view of a ring bracket verification part and PAB module where one of the snap-lock interfaces is not fully seated correctly according to a number of variations.
Figure 10:
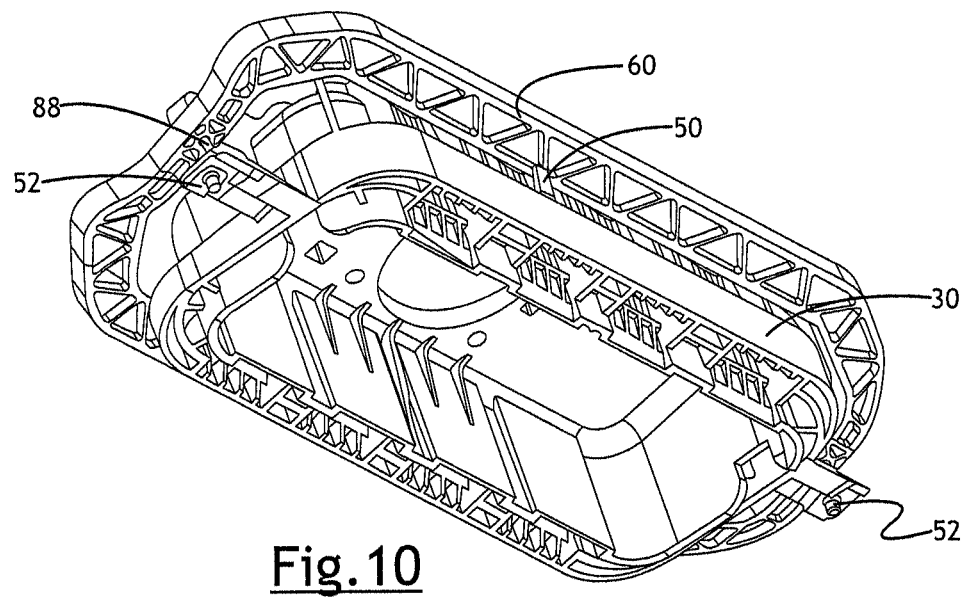
FIG. 10 illustrates a perspective view of a ring bracket verification part and a PAB module where one of the snap-lock interfaces is not fully seated correctly according to a number of variations.

Referring to FIGS. 1-9, in a number of variations, during assembly, the PAB module 30 may be pressed onto the IP chute 10, as described above, so that the snap-locks 50 on the PAB module 30 snap-fit with the chute tabs 28 on the IP chute 10. During installation, the snap-locks 50 may first be deflected outward away from the PAB module 30, and then may spring back to the intended design position tightly aligned with the PAB module 30 once snap-fit in place. If one or more of the snap-locks 50 and chute tabs 28 are not fully engaged, then one or more snap-locks 50 may remain deflected outward away from the PAB module 30, a variation of which is illustrated in FIG. 9.

In a number of variations, the ring bracket 60 may then be used to detect whether each of the PAB module snap-locks 50 are properly engaged with the IP chute tabs 28. In a number of variations, the ring bracket 60 may be placed around the PAB module and IP chute assembly 54 so that the inner surface 72 of the ring bracket 60 surrounds the outer perimeter of the PAB module and IP chute assembly 54 engagement area. If all of the PAB module snap-locks 50 are properly snap-fit within the IP chute tabs 28 and within the cutouts 29, the ring bracket 60 may be evenly seated against the lip 44 of the PAB module 30 so that a first and second screw 88 may be installed into the ring bracket 60 and the PAB module 30 to secure the ring bracket 60 to the PAB module 30, variations of which are illustrated in FIGS. 2 and 8. The assembly plant may then record the presence and/or the torque of the first and second screw 88. If one or more of the PAB module snap-locks 50 are not properly engaged with the IP chute tabs 28, then the ring bracket 60 may be prevented from properly seating against the lip 44 of the PAB module 30 by the one or more outwardly deflecting snap-locks 50. If this occurs, the assembly plant may be prevented from securing the PAB module 30 and the IP chute 10 together with one or both screws 88, variations of which are illustrated in FIGS. 9-12. The assembly plant then be unable to record that the screws 88 have been run down, and the torque may not be recorded indicating that the PAB module 30 and the IP chute 10 are not properly engaged.

Figure 13:
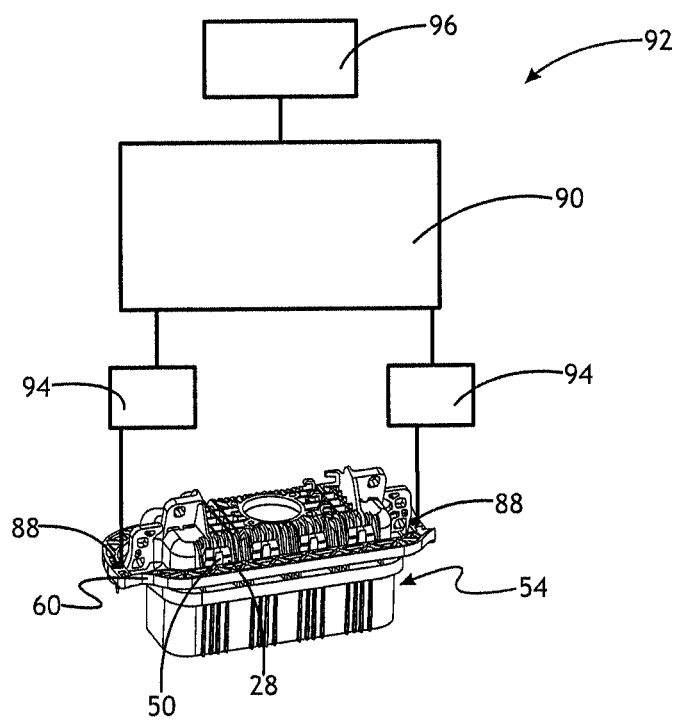
FIG. 13 illustrates a schematic of an assembly station according to a number of variations.

Referring to FIG. 13, in a number of variations, an assembly station 90 may be equipped with an automated control system 92 which may detect and record the presence of the screws 88 and/or the torque of the installed screws 88. The automated control system 92 may include one or more detection devices 94 including, but not limited to, one or more sensors which may relay information to an electronic control panel 96. If one or more of the PAB module snap-locks 50 are not properly snap-fit with the IP chute tabs 28, the ring bracket 60 may not be properly seated on the PAB module 30 so that the screws 88 may not be installed properly. If the one or more detection devices 94 determine that one or both of the screws 88 are missing, or if the torque of one or both of the screws 88 is not within a predetermined range, then the assembly station 90 automated control system 92 may detect the discrepant PAB module and IP chute assembly 54 and may automatically lock the PAB module and IP chute assembly 54 to the assembly station 90 to prevent further processing.

In a number of variations, the electronic control unit 96 may include a main controller and/or a control subsystem which may include one or more controllers (not separately shown) in communication with the one or more detection devices 94 for receiving and processing sensor input and transmitting output signals. The controller(s) may include one or more suitable processors and memory devices (not separately shown). The memory may be configured to provide storage of data.

Figure 11:
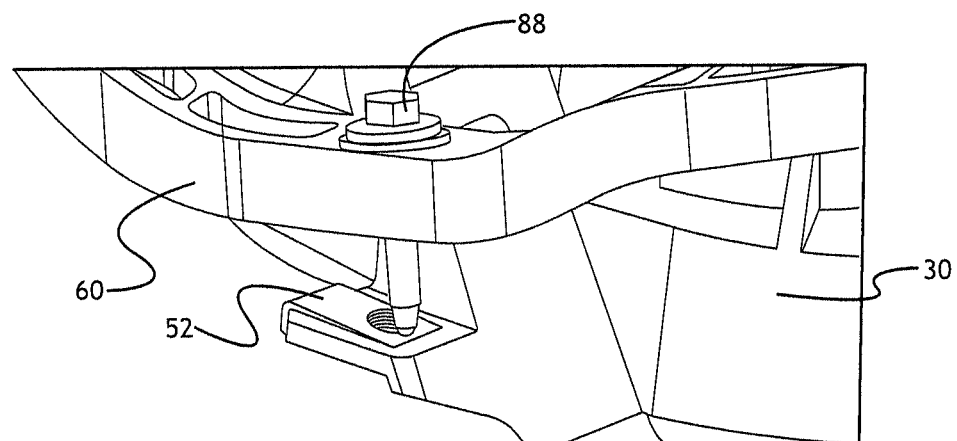
FIG. 11 illustrates a close-up view of a screw interface between a ring bracket and a PAB module where one of the snap-lock interfaces is not fully seated correctly according to a number of variations.
Figure 12:
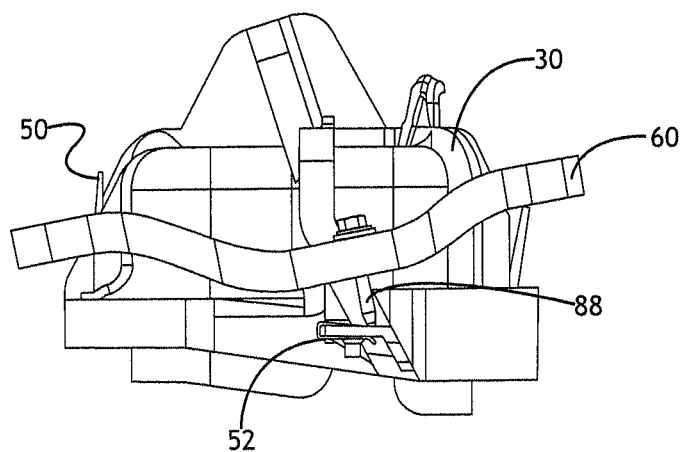
FIG. 12 illustrates a side view of a ring bracket verification part and a PAB module where one of the snap-lock-interfaces is not fully seated correctly according to a number of variations.

In a number of variations, the ring bracket 60 may be constructed and arranged so that a clearance between the ring bracket 60 and the snap engagement area of the PAB module and IP chute assembly 54 may be minimal so that the least amount of misalignment or disengagement between the IP chute tabs 28 and the PAB module snap-locks 50 may be detected. The radius on the inner surface 72 of the ring bracket 60 may be minimized which may prevent lead-in at the interface between the PAB module snap-locks 50 and the IP chute tabs 28 during installation of the ring bracket 60. The openings 42 for the screws 88 on the first and second side surfaces 38, 40 of the PAB module 30 and the openings 70 for the screws 88 on the first and second side portion 66, 68 of the ring bracket 60 may also include a minimum diameter clearance to assure that the screws 88 may not be assembled off axis. The minimum diameter clearance may cause the screws 88 to have a limited range of motion so that if there are one or more unseated snap-locks 50, the screws 88 may not line up with the opening 42 and/or U-clip nut 52 on the PAB module 30, a variation of which is illustrated in FIG. 11. Further, the screws 88 used may comprise a length that will not engage the opening 42 and/or U-clip nut 52 if the ring bracket 60 detects a lack of engagement between one or more of the snap-locks 50 and the chute tabs 28.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method to verify engagement between a passenger airbag module and an instrument panel chute comprising: providing a passenger airbag module with a plurality of snap-locks and an instrument panel chute with a plurality of chute tabs; pressing the passenger airbag module onto the instrument panel chute so that the plurality of snap-locks engage with the plurality of chute tabs; and placing a ring bracket around the plurality of snap-locks and the plurality of chute tabs and attaching the ring bracket to the passenger airbag module using a first screw and a second screw to verify whether the plurality of snap-locks are engaged with the chute tabs.

Variation 2 may include a method as set forth in Variation 1 further comprising an assembly station having an electronic control unit which receives signals from one or more sensors to determine whether the first and the second screw are properly installed in the ring bracket and the passenger airbag module.

Variation 3 may include a method as set forth in Variation 2 further comprising locking the passenger airbag module and the instrument panel chute to the assembly station if the electronic control unit detects that the first or the second screw is not properly installed in the ring bracket and the passenger airbag module.

Variation 4 may include a method as set forth in any of Variations 2-3 wherein the electronic control unit further detects at least one of a presence of the first and the second screw or a torque of the first and the second screw.

Variation 5 may include a method as set forth in any of Variations 2-4 further comprising recording at least one of a presence of the first and the second screw or a torque of the first and the second screw using the electronic control unit.

Variation 6 may include a method to verify passenger airbag module to instrument panel chute snap-lock engagement comprising: snap-fitting a passenger airbag module with an instrument panel chute; placing a ring bracket around a perimeter of the passenger airbag module; screwing a first screw and a second screw through the ring bracket into the passenger airbag module; detecting at least one of a presence of the first screw and the second screw or a torque of the first screw and the second screw in the ring bracket and the passenger airbag module with an automated control system; and locking the passenger airbag module and the instrument panel chute to an assembly station if at least one of the first screw or the second screw is not present or if the torque of the first screw or the second screw is not within a predetermined range.

Variation 7 may include a method as set forth in Variation 6 wherein the automated control system comprises at least one sensor operatively connected to an electronic control unit.

Variation 8 may include a method as set forth in any of Variations 6-7 further comprising recording at least one of the presence of the first and the second screw or the torque of the first and the second screw with the automated control system.

Variation 9 may include a method as set forth in any of Variations 6-8 wherein the ring bracket includes a minimal radius on an inner surface of the ring bracket preventing lead-in at a snap-fit interface between the passenger airbag and the instrument panel chute.

Variation 10 may include a method as set forth in any of Variations 6-9 further comprising providing a minimum clearance between the ring bracket and a snap-fit engagement area of the passenger airbag and the instrument panel chute to detect any misalignment or disengagement of the passenger airbag module and the IP chute.

Variation 11 may include a method as set forth in any of Variations 6-10 further comprising providing the ring bracket and the instrument panel chute each with a first and a second opening for the first and the second screw defined by a first and a second inner surface, and wherein the first and the second opening have a minimum diameter clearance preventing off-axis installation of the first and the second screw.

Variation 12 may include a product comprising: a ring bracket comprising a front portion, a rear portion, a first side portion, a second side portion, an inner surface, and an outer surface, wherein the first side portion and the second side portion are constructed and arranged to each accommodate a screw; and wherein the inner surface of the ring bracket is constructed and arranged to contour an outer perimeter of a passenger airbag module and instrument panel chute assembly engagement area.

Variation 13 may include a product as set forth in Variation 12 wherein the ring bracket is rounded.

Variation 14 may include a product as set forth in any of Variations 12-13 wherein the ring bracket comprises an I-beam geometry.

Variation 15 may include a product as set forth in Variation 14 wherein the ring bracket further comprises a plurality of w-ribs.

Variation 16 may include a product as set forth in any of Variations 12-13 wherein the ring bracket comprises at least one of an L-shape, a T-shape, a U-shape, or a Z-shaped cross-section.

Variation 17 may include a product as set forth in any of Variations 12-16 further comprising one or more lightening holes.

Variation 18 may include a product as set forth in any of Variations 12-17 wherein the ring bracket comprises a plastic.

Variation 19 may include a product as set forth in any of Variations 12-18 wherein the ring bracket is injection molded.

Variation 20 may include a product as set forth in any of Variations 12-19 further comprising a passenger airbag module having a plurality of snap-locks; an instrument panel chute having a plurality of chute tabs; wherein the plurality of chute tabs and the plurality of passenger airbag module snap-locks are snap-fit together; wherein the ring bracket surrounds an engagement area between the plurality of chute tabs and the plurality of snap-locks; and wherein a first screw extends through a first end of the ring bracket and the passenger airbag module and a second screw extends through a second end of the ring bracket and the passenger airbag module.

The above description of select variations within the scope of the invention is merely illustrative in nature and, thus, variations or variants thereof are not to be regarded as a departure from the spirit and scope of the invention.

What is claimed:

1. A method to verify engagement between a passenger airbag module and an instrument panel chute comprising:
   providing a passenger airbag module with a plurality of snap-locks and an instrument panel chute with a plurality of chute tabs;
   pressing the passenger airbag module onto the instrument panel chute so that the plurality of snap-locks engage with the plurality of chute tabs; and
   placing a ring bracket around the plurality of chute tabs and the plurality of snap-locks and attaching the ring bracket to the passenger airbag module using a first screw and a second screw to verify whether the plurality of snap-locks are engaged with the plurality of chute tabs.

2. The method of claim 1 further comprising an assembly station having an electronic control unit which receives signals from one or more sensors to determine at least one of whether the first screw and the second screw are present in the ring bracket and the passenger airbag module or a torque of the first screw and the second screw.

3. The method of claim 2 further comprising recording at least one of the presence of the first screw and the second screw or the torque of the first screw and the second screw using the electronic control unit.

4. A method to verify passenger airbag module to instrument panel chute snap-lock engagement comprising:
   snap-fitting a passenger airbag module with an instrument panel chute using a plurality of snap-locks and a plurality of tabs;
   placing a ring bracket around an outer perimeter of the passenger airbag module and the instrument panel chute along at least a portion of the plurality of snap-locks and the plurality of tabs, wherein if the plurality of snap-locks and the plurality of tabs are fully engaged, then the ring bracket fully seats against a lip on the instrument panel chute and if at least one of the plurality of snap-locks and at least one of the plurality of tabs are not fully engaged the ring bracket is not fully seated against the lip on the instrument panel chute;
   screwing a first screw and a second screw through the ring bracket into the passenger airbag module; and
   wherein if the ring bracket is fully seated against the instrument panel chute, the first screw and the second screw are torqued to a predetermined range and if the ring bracket is not fully seated against the instrument panel chute, at least one of the first screw or the second screw cannot be torqued to the predetermined range.

5. The method of claim 4 wherein the ring bracket includes a minimal radius on an inner surface of the ring bracket preventing lead-in at a snap-fit interface between the passenger airbag and the instrument panel chute.

6. The method of claim 4 further comprising providing a minimum clearance between the ring bracket and a snap-fit engagement area of the passenger airbag and the instrument panel chute to detect a misalignment or disengagement of the passenger airbag module and the instrument panel chute.

7. The method of claim 4 further comprising providing the ring bracket and the instrument panel chute each with a first and a second opening for the first and the second screw defined by a first and a second inner surface, and wherein the first and the second opening have a minimum diameter clearance preventing off-axis installation of the first and the second screw.

8. The method of claim 4 further comprising using an automated control system to detect at least one of the presence of the first screw and the second screw or a torque of the first screw and the second screw, and wherein the automated control system comprises at least one sensor operatively connected to an electronic control unit.

9. The method of claim 8 further comprising recording at least one of the presence of the first and the second screw or the torque of the first and the second screw with the automated control system.

10. A product comprising:
a ring bracket comprising a front portion, a rear portion, a first side portion, a second side portion, an inner surface, an outer surface, a top surface, and a bottom surface, wherein the first side portion includes a first opening defined by a surface of the first side portion which extends through the top surface to the bottom surface and the second side portion includes a second opening defined by a surface of the second side portion which extends through the top surface to the bottom surface;
wherein the inner surface of the ring bracket is constructed and arranged to contour an outer perimeter of a passenger airbag module and instrument panel chute assembly engagement area;
a passenger airbag module having a plurality of snap-locks;
an instrument panel chute having a plurality of chute tabs;
wherein the plurality of chute tabs and the plurality of snap-locks are snap-fit together;
wherein the ring bracket surrounds an engagement area between the plurality of chute tabs and the plurality of snap-locks; and
wherein a first screw extends through a first end of the ring bracket and the passenger airbag module and a second screw extends through a second end of the ring bracket and the passenger airbag module.

11. The product of claim 10 wherein the ring bracket is rounded.

12. The product of claim 10 wherein the ring bracket comprises at least one of an L-shape, a T-shape, a U-shape, or a Z-shaped cross-section.

13. The product of claim 10 further comprising one or more lightening holes.

14. The product of claim 10 wherein the ring bracket comprises a plastic.

15. The product of claim 10 wherein the ring bracket is injection molded.

16. The product of claim 10 wherein the ring bracket comprises an I-beam geometry.

17. The product of claim 16 wherein the ring bracket further comprises a plurality of w-ribs.

* * * * *